A. C. DECKER.
BARBED FENCE-WIRE.

No. 178,605. Patented June 13, 1876.

Witnesses:
Donn P. Twitchell
Will H. Dodge

Inventor:
A. C. Decker
By his attys.
Dodge & Son

UNITED STATES PATENT OFFICE.

ALEXANDER C. DECKER, OF BUSHNELL, ILLINOIS.

IMPROVEMENT IN BARBED FENCE-WIRES.

Specification forming part of Letters Patent No. 178,605, dated June 13, 1876; application filed May 3, 1876.

*To all whom it may concern:*

Be it known that I, ALEXANDER C. DECKER, of Bushnell, in the county of McDonough and State of Illinois, have invented certain Improvements in Barbed-Wire Fences, of which the following is a specification:

My invention relates to that class of barbed-wire fences in which the barbs are coiled around the fence-wire; and the invention consists in forming the round fence-wire with one or more small beads or ribs lengthwise on its surface, so that when the barbs are applied they will crush down the rib below them, leaving shoulders on each side to prevent them from slipping, and also holding them the more securely from turning.

By providing the main or fence wire with the bead I am enabled to secure the barbs firmly at any point thereon, and in such manner that they will not be affected or loosened by the straining of the wire, while at the same time I can manufacture the fence at a cost as low as that of the cheapest now in use.

Figure 1:
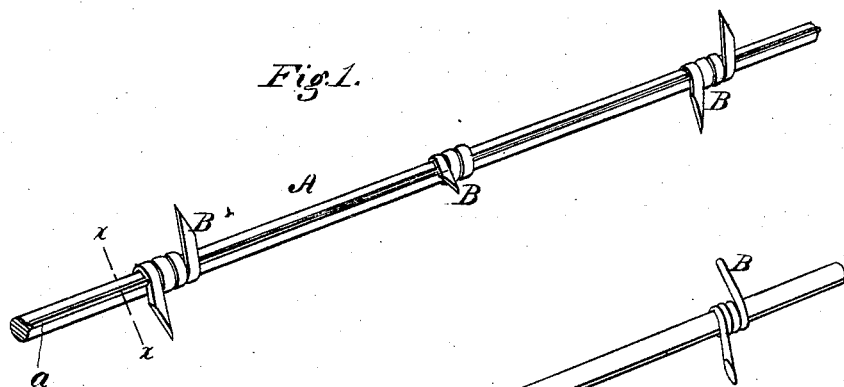
Figure 2:
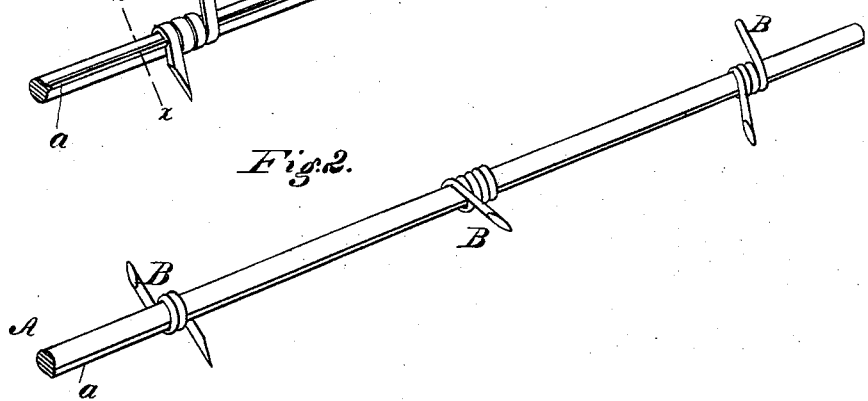
Figure 3:
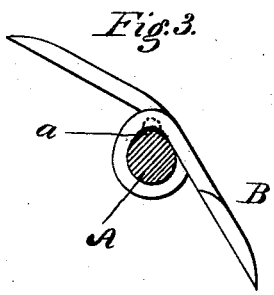
Figure 4:

Figure 1 represents a perspective view of my improved fence, having barbs of flat wire; Fig. 2, a perspective view of the fence, having its barbs made of round wire; Fig. 3, a cross-section on the line $x\,x$ of Fig. 1; Fig. 4, a perspective view of the main wire, showing the manner in which the rib is crushed down by the barbs.

A represents the fence-wire, made of a round form, with one or more small continuous ribs or beads, $a$, lengthwise upon its exterior surface; and B represents the barbs, consisting of short pieces of wire, sharpened at both ends, and wound at the middle one or more times around the wire A, and pressed down thereon with sufficient force to crush the rib or bead $a$, in the manner represented in Fig. 4, so that the unbroken portion of the rib, bearing against the sides of the barbs, holds the same from moving longitudinally, while at the same time the portion crushed down presents a rough and irregular bearing for the barbs, and makes more or less impression thereon, so as to aid in preventing their rotation.

By the combination of the ribbed wire and the barbs wound and compressed thereon, in the manner shown and described, I produce a fence-wire consisting of a single strand, having its barbs held securely from sliding or turning, and thus I overcome the excessive expense of the common two-strand wires, as well as the objectionable looseness of the barbs common to single-strand wires of the usual construction.

Having thus described my invention, what I claim is—

The combination, with the round wire A, having one or more longitudinal beads, $a$, formed thereon, of the wound barbs B, compressed upon said wire in such manner that the bead is crushed down within them, as and for the purpose described.

ALEXANDER C. DECKER.

Witnesses:
   JOSEPH B. MCCONNELL,
   G. H. MCELVAIN.